US010131201B1

(12) United States Patent
Yeomans et al.

(10) Patent No.: US 10,131,201 B1
(45) Date of Patent: Nov. 20, 2018

(54) COOLING SYSTEM FOR DOME OF AUTONOMOUS VEHICLE

(71) Applicant: Waymo LLC, Mountain View, CA (US)

(72) Inventors: Paul Yeomans, Mountain View, CA (US); Peter Avram, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 437 days.

(21) Appl. No.: 14/744,870

(22) Filed: Jun. 19, 2015

(51) Int. Cl.
*B60H 1/00* (2006.01)
*B60H 1/24* (2006.01)
*B60H 1/34* (2006.01)

(52) U.S. Cl.
CPC ..... *B60H 1/00821* (2013.01); *B60H 1/00735* (2013.01); *B60H 1/245* (2013.01); *B60H 1/34* (2013.01)

(58) Field of Classification Search
CPC ............ B60H 1/00821; B60H 1/00735; B60H 1/245; B60H 1/34
USPC ............................................. 454/60, 69, 137
See application file for complete search history.

(56) References Cited

U.S. PATENT DOCUMENTS

| | | | | |
|---|---|---|---|---|
| 5,605,055 A | * | 2/1997 | Salgado | B60H 1/00371 62/244 |
| 6,202,934 B1 | * | 3/2001 | Kamiya | B60H 1/00735 165/204 |
| 8,033,899 B2 | * | 10/2011 | Ichikawa | B60H 1/00378 296/39.3 |

OTHER PUBLICATIONS

Narayan, A., "Dyson's bladeless fan: worth the hefty cost?", Oct. 21, 2009, [retrieved on Aug. 28, 2015], <URL: http://content.time.com/time/health/article/0,8599,1931455,00.html>.

* cited by examiner

*Primary Examiner* — Gregory Huson
*Assistant Examiner* — Ryan Faulkner
(74) *Attorney, Agent, or Firm* — Lerner, David, Littenberg, Krumholz & Mentlik, LLP

(57) ABSTRACT

A cooling device includes a duct, a passageway, and a plurality of nozzles spaced around the duct. The duct is sized to extend around at least a portion of the dome. The passageway may extend through the duct. The plurality of nozzles may be spaced around the duct and have first openings oriented toward the passageway and second openings oriented toward the surface.

10 Claims, 12 Drawing Sheets

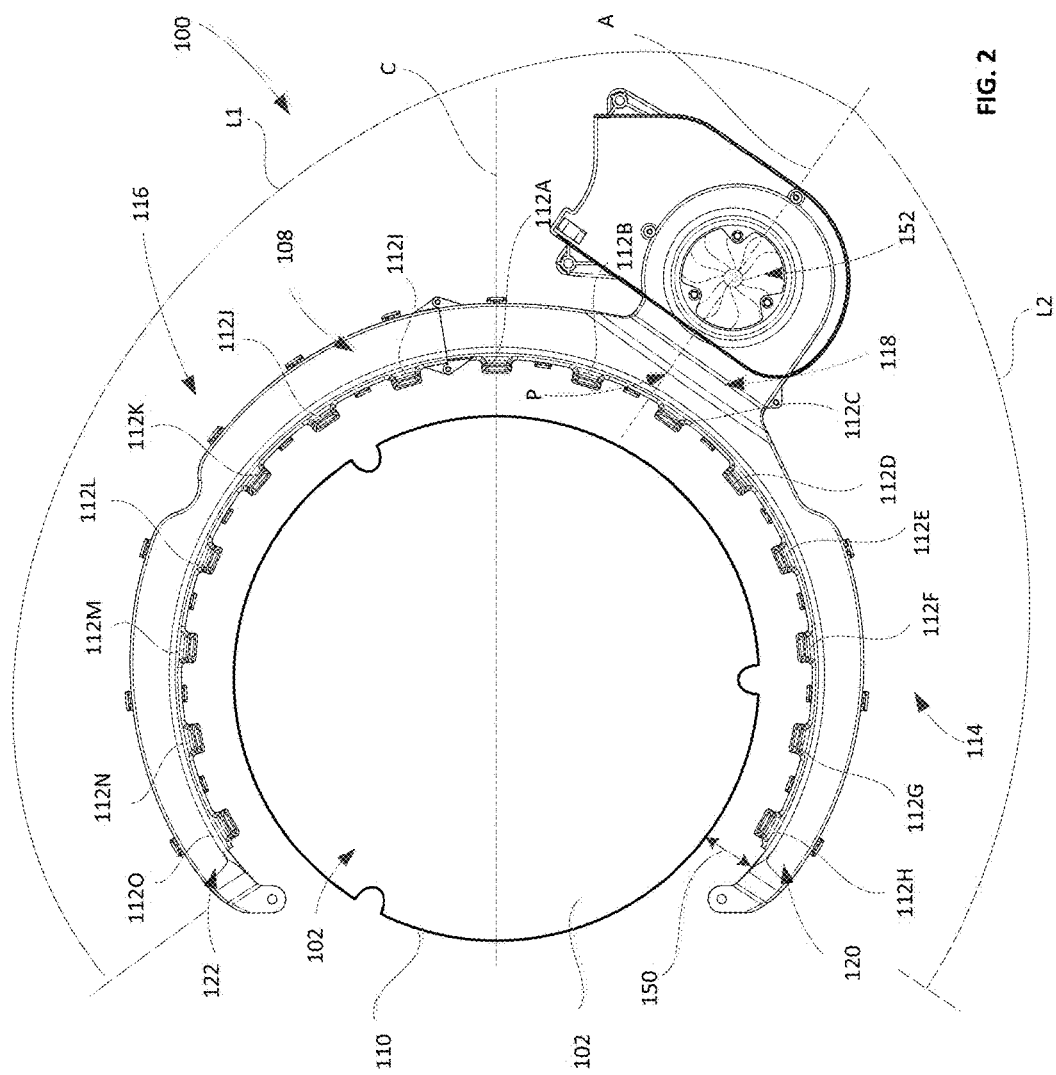

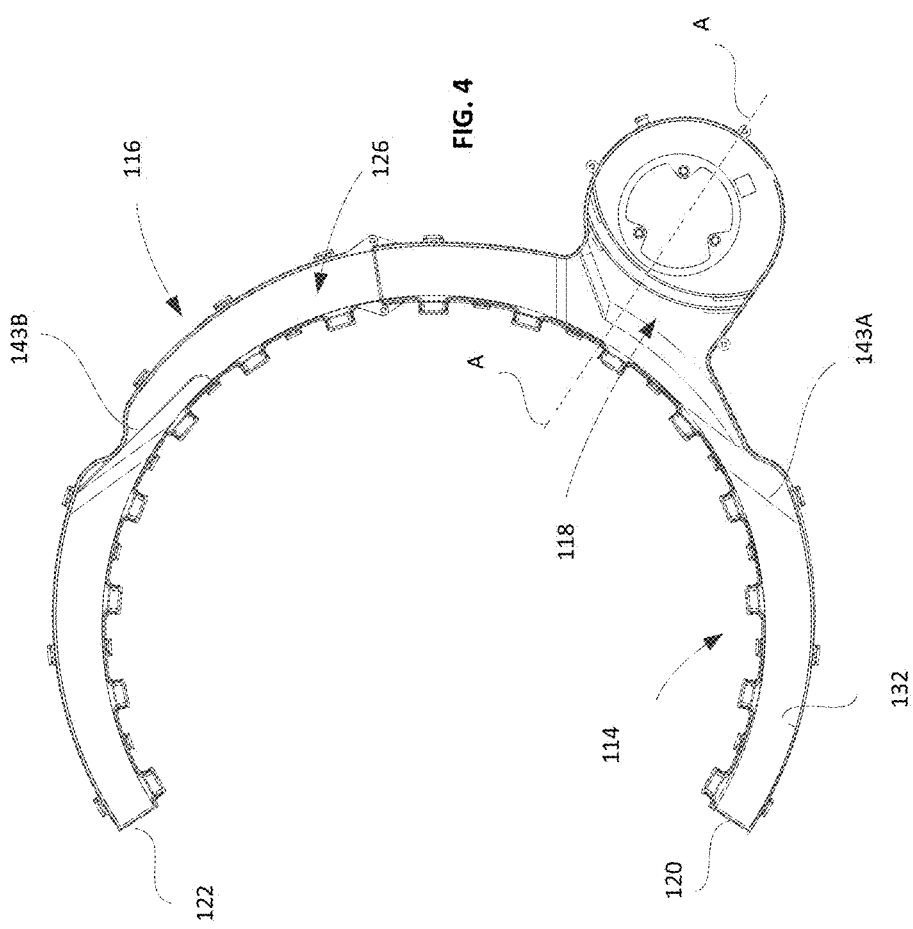

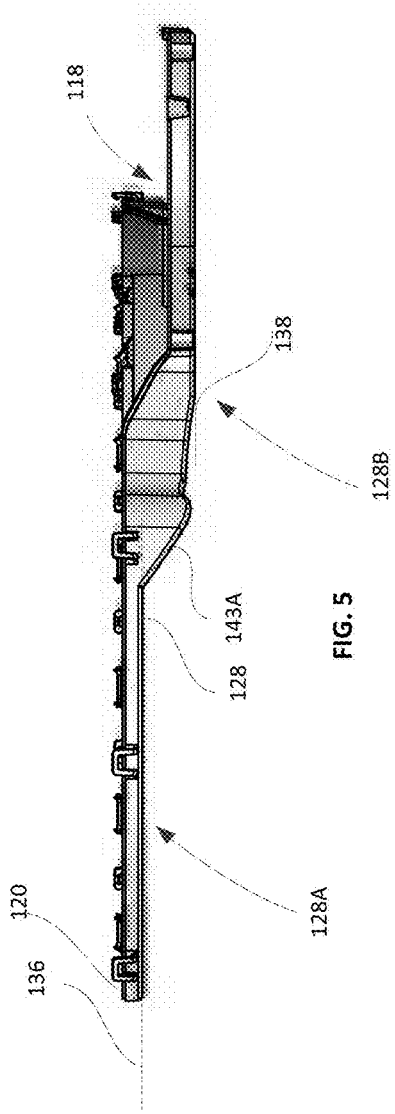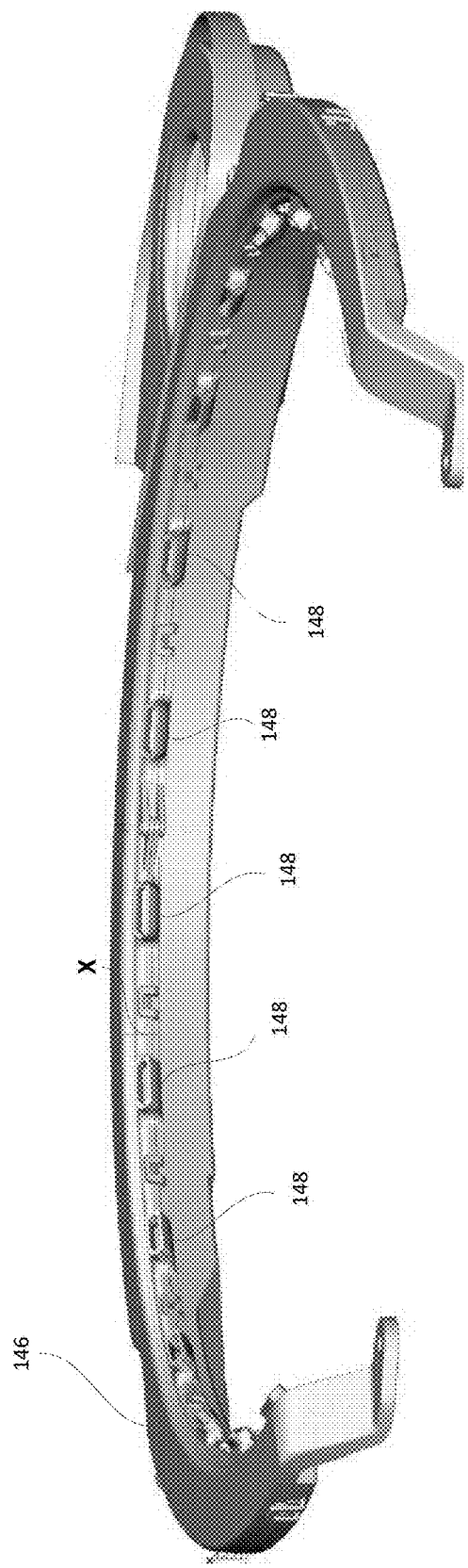

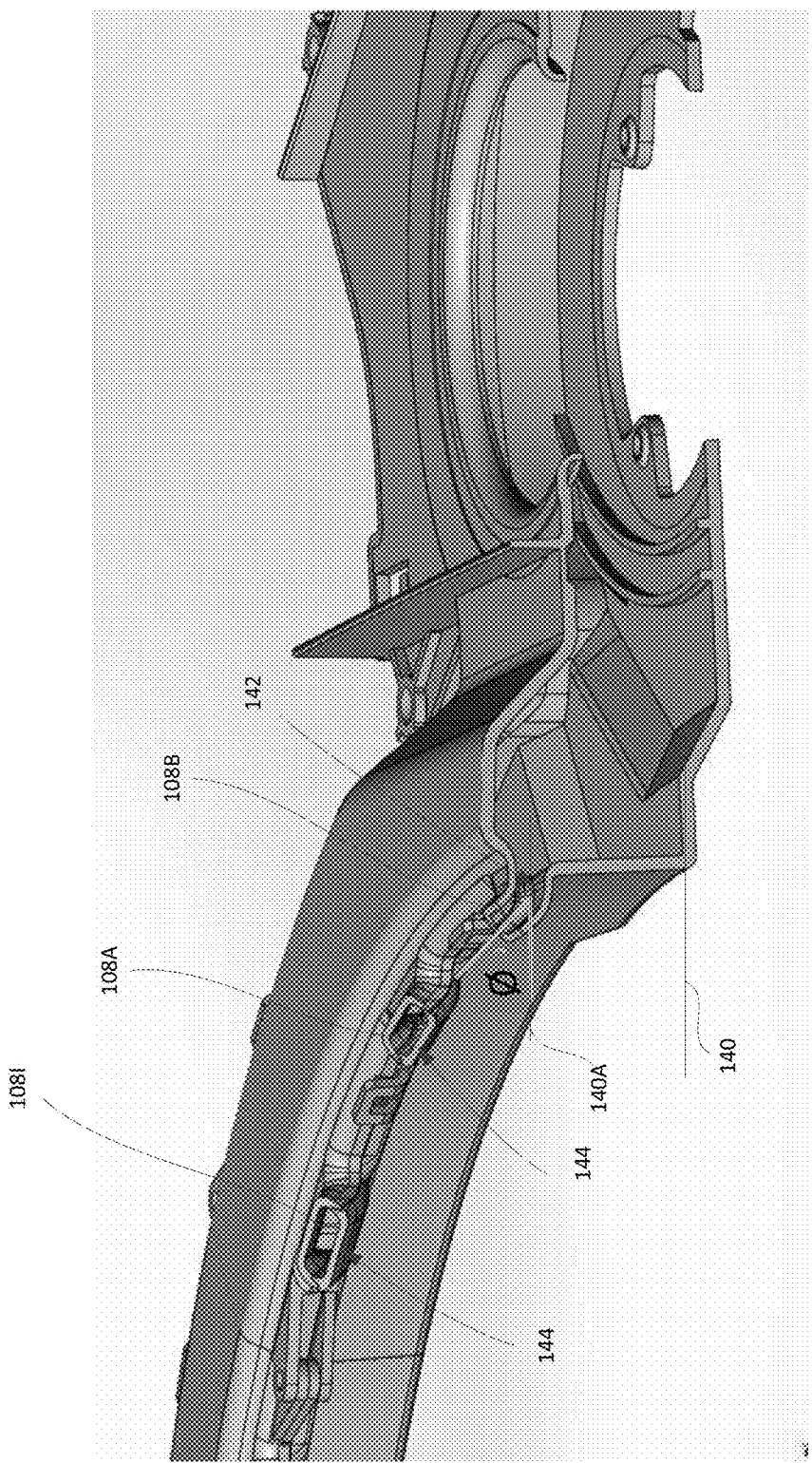

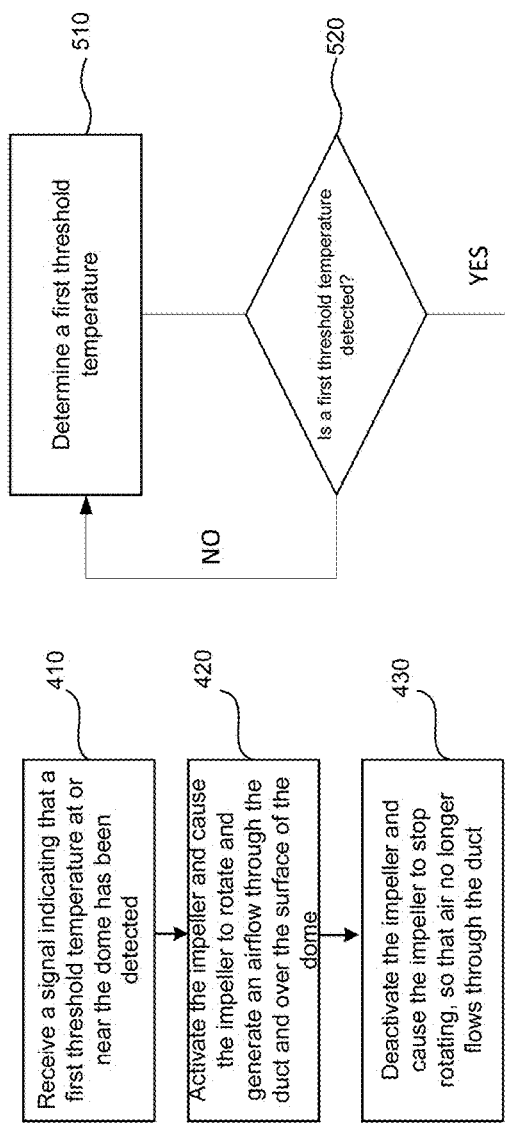

COOLING SYSTEM FOR DOME OF AUTONOMOUS VEHICLE

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle.

In some instances, the laser scanning equipment and cameras may malfunction due to overheating caused by the outer environment, as well as the heat generated by the device itself. Malfunctioning equipment can reduce the accuracy and reliability of information generated by the sensors. This, in turn, may impact the safe maneuvering of such vehicles.

BRIEF SUMMARY

Aspects of the disclosure provide a cooling system for cooling the surface of a dome. The cooling system can include a cooling device that distributes air onto the surface of the dome to rapidly and efficiently cool the surface of the dome. The cooling system may be automated so that the cooling system operates only when certain conditions have been satisfied.

A cooling device according to a first aspect of the disclosure includes a duct, a passageway, and a plurality of nozzles. The duct sized to extend around at least a portion of a base of a dome. The passageway extends through the duct. The plurality of nozzles may be spaced around the duct and face the dome. The plurality of nozzles may also have first openings oriented toward the passageway and second openings oriented toward a surface of the dome.

In accordance with this aspect of the disclosure, the duct has first and second ends spaced apart from one. The duct may extend greater than 180 degrees but less than 360 degrees around the dome.

In accordance with this aspect of the disclosure, the duct may include two arms joined together at one end and each of the arms has respective free ends spaced apart from one another, the duct being tapered in two directions from the one end toward the respective free ends. The passageway may extend through the tapered duct from the one end toward the respective free ends.

In accordance with this aspect, the cooling device may further include an air source. The air source may be a blower positioned adjacent an entrance to the duct.

In accordance with this aspect of the disclosure, a bottom surface of the duct extends across a plane. The nozzles may extend in a direction away from the bottom surface and toward the dome at an acute angle. The acute angle can range between 20-89 degrees.

In another example, the nozzles are evenly spaced along the ring.

Turning to a second aspect of the present disclosure, a system may include a dome; a control device; a temperature sensor positioned at or near the dome; a cooling device and an air source. The temperature sensor may be configured to send a notification signal to the control device when a pre-determined temperature at or near the dome is detected. The cooling device may further include a duct extending at least partially around the base of the dome. The duct may have an interior passageway and a plurality of nozzles spaced around the duct. The air source may be configured to distribute air through the interior passageway and the plurality of nozzles. The control device may include one or more processors configured to receive the signal from the temperature sensor; determine whether to activate or deactivate the air source; and activate or deactivate the air source based upon the determination.

According to this aspect of the disclosure, the cooling system may further include a vehicle and the dome may be positioned on top of the vehicle.

According to another example of this aspect of the disclosure, the duct may comprise two arms at least partially extending around the base of the dome. The two arms may be joined together at one end and each of the arms may have respective free ends. The free ends may be spaced apart from one another so as to create an opening between the free ends.

In another example of this aspect of the disclosure, the air source may be a single point blower.

In another example of this aspect of the disclosure, the plurality of nozzles may be evenly spaced around the duct and at least some of the plurality of nozzles may have an acute angle relative to a base of the duct.

In another example, at least one humidity sensor positioned at or near the dome.

In still another example of this aspect of the disclosure, the step of determining whether to activate the air source is based upon whether a first pre-determined temperature is detected, and the step of determining whether to deactivate the air source is based upon whether a second pre-determined temperature is detected.

According to another aspect of the disclosure, a method for cooling a surface of a dome includes determining, using one or more processors, that the dome or a component within the dome has reached a threshold temperature; distributing airflow through a duct that extends at least partially around the dome so that a plurality of streams of air are directed toward the surface of the dome; and controlling, using the one or more processors, the speed of airflow and a location each of the plurality of streams of air contact the surface of the dome so that each of the plurality of streams of air have a constant speed and pressure as each of the plurality of streams of air extend along the surface of the dome.

In another example of this aspect of the disclosure, the method further includes activating a source of airflow in response to determining that the threshold temperature has been reached.

In still another example, the method further includes determining that the dome or the component identified as being at a threshold temperature is no longer at the threshold temperature; and deactivating the source of airflow.

BRIEF DESCRIPTION OF THE DRAWINGS

FIG. 2 is a top view of a cooling system of FIG. 1, with the portions of the vehicle removed to better illustrate the features of the cooling system.

FIG. 4 is a top view of a portion of the duct of FIG. 3.

FIG. 5 is a side view of the portion of the duct of FIG. 4.

FIG. 6 is a front perspective view of the duct of FIG. 2 without the air blower.

FIG. 7 is a perspective cross-sectional view of the duct of FIG. 5 without the air blower.

FIG. 12 is an example flow diagram in accordance with aspects of the disclosure.

FIG. 13 is another example flow diagram in accordance with aspects of the disclosure.

DETAILED DESCRIPTION

Figure 1:
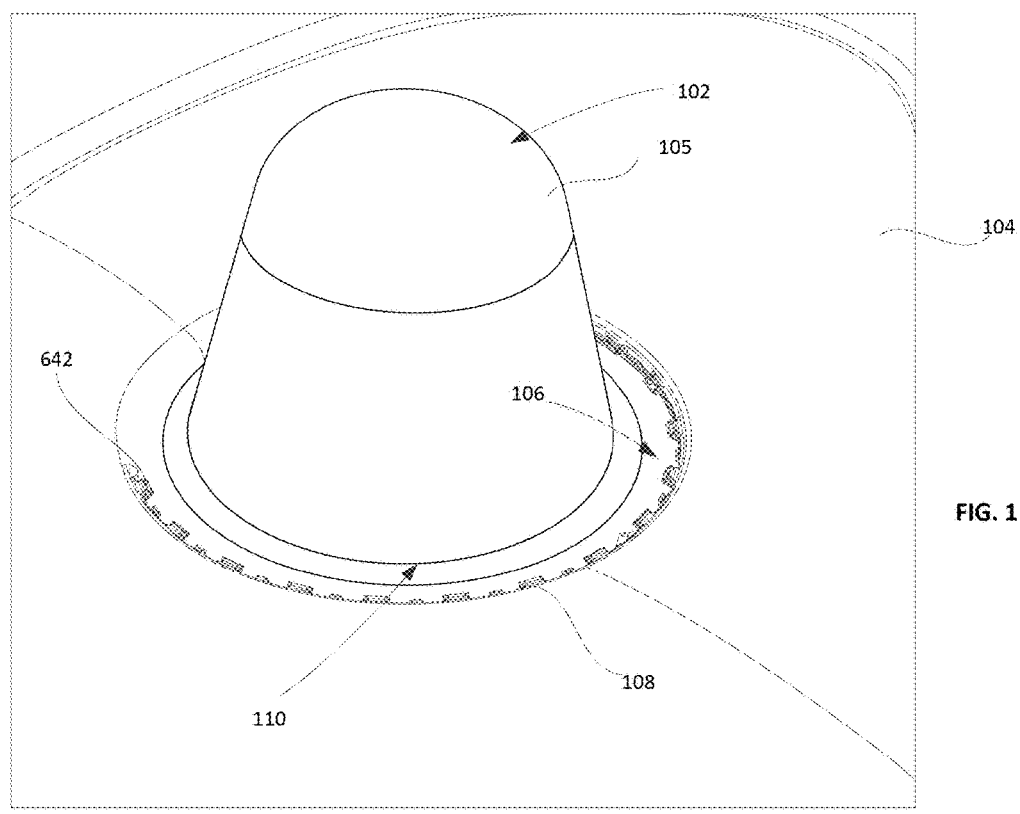
FIG. 1 is a perspective view of an example cooling system positioned on a vehicle according to aspects of the disclosure.

The present disclosure is directed to a method, device, and system for cooling a surface of a dome that is both positioned on top of a car assembly and used to house equipment, such as cameras and laser scanners. Due to constant and direct exposure to sunlight, as well as heat generated by mechanical and electrical components, the equipment within the dome often reaches temperatures that can cause the equipment to malfunction. For example, the cameras and sensors within the dome can overheat and fail to communicate with one another or independently fail to perform a designated function. To address this, a cooling device can be utilized to maintain the temperature of the dome at or below a threshold or pre-determined temperature, which in turn causes the components within the dome to also cool down. An example device can include a duct with a passageway that extends around at least a portion of the base of a dome. An air source can provide a constant flow of air through the passageway and into nozzles that extend around the circular duct. The nozzles can be positioned around the dome so that streams of air flowing through the passageway and exiting the nozzles are directed toward the surface of the dome. The design of the duct and distribution of the nozzles may allow for even distribution of air flow over the dome, which in turn allows for rapid cooling of the surface of the dome and the components within the dome.

The cooling device may include a duct that extends around the base of the dome. In one example, the duct may be circular and extend at least partially around the base of the dome. A duct extending partially around the dome may be comprised of two arms that are joined together at one end and that each has second free ends. The duct may be wider at the point where the arms are joined together and taper toward the free ends.

Passageways within the duct may be designed to control air flow. For example, passageways may be of different shapes and sizes, and may also include surfaces that vary the speed of air as it passes through the passageway. In one example, the passageway may include inclined and tapered surfaces to direct airflow and control the speed and movement of airflow.

A plurality of nozzles may be arranged around the duct. For example, nozzles may be evenly spaced around the arms of the circular duct. The nozzles may be positioned at angles relative to the base of the duct. In one example, the nozzles may be positioned at an acute angle, such as between 20 degrees to 89 degrees. For example, the nozzles may be positioned at approximately 50 degrees.

The duct may include an air intake. In one example, the air intake is offset so that it is not positioned at a point halfway exactly between the first and second arms. The air intake may instead be positioned slightly closer to the ends of one of the first or second arms.

An air source may be provided near the entrance of the air intake of the circular duct. For example, a centrifugal blower including an impeller with reverse curve blade tips may be positioned at or close to the opening. When activated, the blower can create a constant airflow that can travel through the entire length of the passageway of the circular duct. As discussed above, the air intake is offset, which can provide the ability for the air flow to be evenly distributed at a constant velocity through each of the first and second arms.

A plurality of air streams may exit the duct through respective nozzles. As the air streams exit the nozzles, each of the air streams that exit through the nozzles may have a substantially constant velocity. The plurality of air streams can be evenly distributed over the surface of the dome. In one example, the air streams may each also have a substantially constant velocity and pressure as the air streams travel over the surface of the dome. In this regard, the design of the duct and overall system allows for a constant velocity of air exiting each nozzle, with only a single air source. Additionally, a constant velocity can be maintained as the air passes over the dome. This overall design may allow the entire dome or parts of the dome to rapidly and evenly cool down.

Operation of the cooling device can be controlled by a control system, including one or more computing devices. For example, the control system can activate the cooling system when it is determined that the temperature of the dome, the interior of the dome, or components within the dome have reached a threshold limit. Once the system is activated, the control system can continuously monitor the temperatures of these components and deactivate the cooling device when one or more of the components reaches or a second predetermined temperature.

The temperature exterior to the dome, within the dome, and of components within the dome can be detected by the control system of the cooling device. For example, one or more sensors within the control system, such as an ambient temperature sensor, can be used to determine whether the temperature is at pre-determined or threshold temperature. One or more such sensors may be provided throughout the system, such as on the dome, the interior space of the dome, and/or the exterior of the dome to monitor temperature. Sensors may also be placed directly onto the equipment. Thus, each sensor may be used to identify a different threshold temperature, depending on its location.

The one or more temperature sensors may communicate with the control system to indicate whether the threshold temperature has been reached. For example, the temperature sensor may periodically send a temperature reading to the control device. Each time the temperature sensor determines that the threshold temperature has been reached, the sensor can send a notification signal to the control system to indicate that the threshold temperature has been detected.

The control system may activate the air source when the notification signal is received by the control system from the temperature sensor. The air source can create an air flow that is sufficient to travel through the passageway of the duct.

While the air source is generating airflow, the temperature sensor can continue to periodically send a temperature reading to the control device. When the temperature sensor determines that the temperature has been cooled down to a second pre-determined temperature, the temperature sensor can send a notification signal to the control system indicating that the second pre-determined temperature has been reached. For example, the second pre-determined temperature may be at the threshold temperature or one or more degrees below the threshold temperature.

When the temperature sensor determines that the second pre-determined temperature has been reached, the temperature sensor can send a notification signal to the control system to deactivate the air source.

Structure of the Cooling System

As noted above, an example cooling system may include a cooling device positioned around at least part of a dome that is positioned on the roof of a vehicle. The cooling device may further include a passageway extending entirely or partly through the duct. Air generated by an air source is distributed through the passageway of the duct and through nozzles positioned along the duct. Nozzles may be oriented toward dome so that airflow traveling through the passageway exits through ducts and contacts the outer surface of the dome. The airflow rapidly cools down the temperature of the dome and the equipment within the dome.

An example cooling system 100 is shown in FIGS. 1-2, where FIG. 1 shows the cooling system 100 installed as part of a vehicle assembly and FIG. 2 illustrates a top view of the cooling system 100 of FIG. 1 without the components of the vehicle assembly for ease of discussion. Cooling system 100, portions of which are visible in FIG. 1, may be used to cool down the surface 105 of a dome 102 positioned adjacent the top or roof 106 of a vehicle assembly. Dome 102 may include a planar bottom surface and may be comprised of a transparent material or an opaque material. Similarly, the dome 102 itself may be comprised of any desired material and further coated with other materials that can range between being opaque and transparent. Cameras, laser scanning equipment, and the like may be housed within dome 102 to obtain information about the absolute or relative position of the vehicle assembly 104 on a map or on the earth, as well as the location of objects external to the vehicle assembly, such as other vehicles, obstacles in the roadway, traffic signals, trees, etc.

The cooling system 100 may include a cooling device 106, which includes a duct 108. As shown in this example, duct 108 can include an air intake entrance 118 (FIG. 4) positioned between a first end 120 and a second end 122 of duct 108. Air intake entrance 118 can serve as a central inlet for air generated by the cooling system 100 to travel into the duct 108.

The duct 108 can be configured to extend at least partially or fully around the base 110 of duct 108. In the example of FIGS. 1 and 2, duct 108 extends partially around base 110 of dome 102 and tapers toward the first and second ends 120,122. Duct 108 may be comprised of a rigid or semi-rigid material, such as a polymeric material or thermoplastic resin. In other examples, duct 108 can be comprised of a metallic material, such as aluminum or the like.

The duct 108 may be configured in a variety of shapes that extend around portions of dome 102. Referring to FIG. 2, duct 108 may be a continuous and semi-circular shaped duct 108. In this example, duct 108 can include a semi-circular first arm 114 and a semi-circular second arm 116, each of which extend around base 110 of dome 102 and form a continuous semi-circular duct 108. In other examples, the duct 108 may take on other shapes, such as a square, triangle, and oblong. Similarly, the duct 108 may be a series of smaller ducts 108 extending around the base 110 of the dome 102, instead of a single continuous duct 108.

The first and second arms 114,116 may be joined together along a common point. For example, as shown in FIG. 2, a centerline A of an air intake entrance 118 can be used as a reference line to indicate a common point P where first and second arms 114,116 are joined together. First and second arms 114,116 can each extend outwardly away from the common point P to a respective second end 122 of the first arm 114 and a respective second end 122 of the second arm 116. The first and second ends 120,122 may be spaced apart from one another, such that they do not extend all the way around the circumference of dome 102.

Reference line C is positioned at a point on the duct 108 halfway between the first and second ends 120,122 of the respective first and second arms 114,116. In this example, reference line A, where first and second arms 114,116 meet, does not coincide with reference line C. Reference line A, which is taken through air intake entrance 118, is offset from reference line C, such that second arm 116 has a length L1 that is greater than the length L2 of first arm 114. In other examples, second arm 116 may have a length L1 that is less than the length L2 of the first arm 114. In still other examples, the lengths L2, L1 of respective first and second arms 114,116 may be the same, such that the reference line A of the air intake and the reference line C of the duct 108 coincide with one another.

Figure 2A:
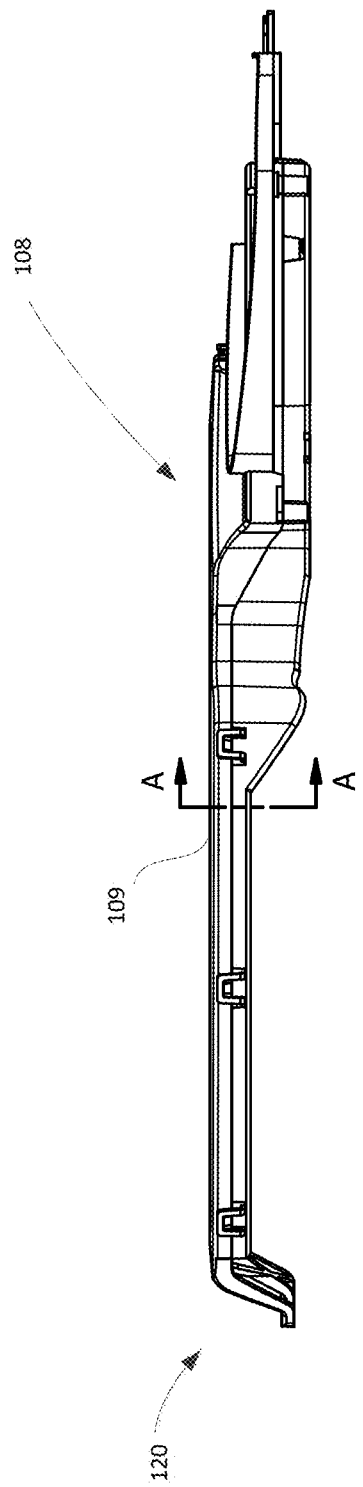
FIG. 2A is a side view of the duct of the cooling system shown in FIG. 2.

The duct may include a planar top surface. For example, as shown in FIG. 2A, a profile of duct 108, top surface 109 of duct 108 can be substantially planar. The bottom surface 111 of duct 108 may extend along different planes, such that a portions of duct 108 adjacent to the air intake extends along one plane and portions of duct 108 adjacent the outer ends of duct 108 extend along a different plane.

Figure 3:
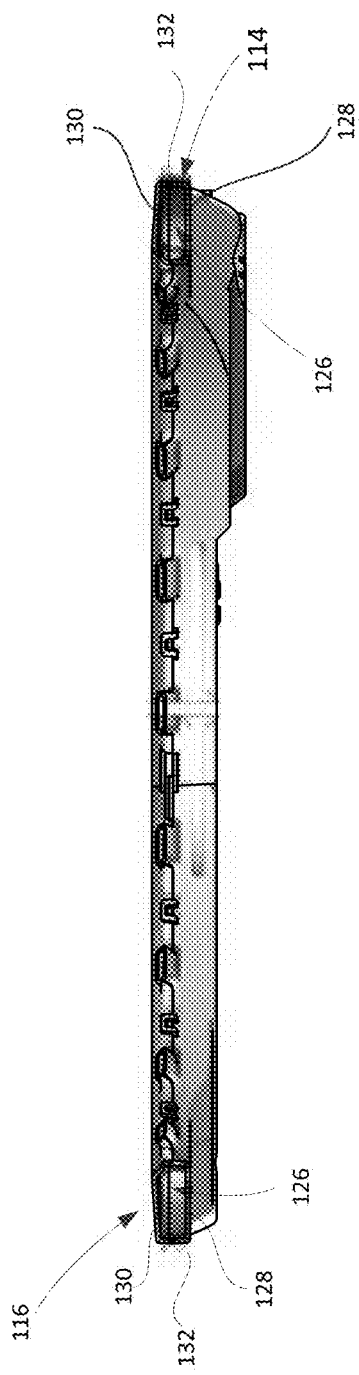
FIG. 3 is a cross-sectional view of a duct taken trough line A-A of FIG. 2A.

Duct 108 may include an interior cavity or passageway. In one example, duct 108 includes a continuous passageway 126 that provides a pathway for distribution of air through the duct 108. As shown, for example, in FIG. 3, a cross-sectional view of the duct 108, passageway 126 extends through both the first arm and second arms 114,116. Passageway 126 can be comprised of the duct bottom surface 128, duct top surface 130, and duct wall surfaces 132 that extend between the bottom and top surfaces 128,130. In other examples, the passageway 126 may not be formed as a continuous passageway.

FIG. 4 illustrates the length and shape of the interior passages. As shown in this view, where the top portion of the duct 108 has been removed for ease of illustration, passageway 126 is shown extending continuously along both the first and second arms 114,116 of the duct 108. First and second arms 114,116 extend away from reference point A. Air intake entrance 118 is also further illustrated. Passageway 126 is shown slightly tapering towards the respective first and second ends 120,122 of the respective first and second arms 114,116.

The passageway and overall shape of the duct 108 may be configured to direct flow of air through the duct 108. Passageway 126 of duct 108 may include varied surfaces, such as sloped surfaces 143, tapered surfaces, and the like. For example, as shown in FIGS. 4-5, duct 108 includes sloped surface 143A along first arm 114 and a sloped surface 143B along second arm 116. Sidewalls 132 (FIG. 4) may also taper from the air intake entrance 118 at reference line A to respective ends 120,122.

The bottom surface 128 of duct 108 may extend along one or more planes. As shown in FIGS. 4-5, for example, a portion 128A of bottom surface 128 duct 108 adjacent the end 120 of first arm 114 may extend along a first plane 136 and another portion 128B of duct 108 adjacent air intake entrance 118 may extend along a second plane 138. First and second planes 136,138 may be joined together by sloped surface 143A, so as to create a continuous passageway 126.

Nozzles may extend along the length of duct 108. As shown in FIG. 2, for example, fifteen nozzles 112A-O may be spaced along the duct 108 so that nozzles 112A-O extend around the majority of the base 110 of the dome 102, i.e., less than three-hundred sixty degrees around the dome 102, but greater than one hundred eighty degrees around the dome 102. A first nozzle 112A may be positioned at 0 degrees, which also coincides with reference line A. Seven nozzles 112I-112O may be spaced to the right of first nozzle 112A and seven nozzles 112C-112H may be spaced to the left of first 112A. The nozzles 112A-O may be positioned along duct 108 relative to nozzle 112A in various configurations. In one example, the nozzles can be spaced, as follows:

| NOZZLE | DEGREES ALONG DUCT 112 RELATIVE TO NOZZLE 112A |
|---|---|
| 112A | 0 |
| 112B | 18.45 |
| 112C | 35.45 |
| 112D | 51.00 |
| 112E | 68.05 |
| 112F | 85 |
| 112G | 77.95 |
| 112H | 60.95 |
| 112I | −18.45 |
| 112J | −35.45 |
| 112K | −51.00 |
| 112L | −68.05 |
| 112M | −85 |
| 112N | −77.95 |
| 112O | −60.95 |

In other examples, there may be fewer or greater number of nozzles 112. The nozzles 112 may also be evenly spaced apart from one another, may incrementally increase or decrease in space from one another, or vary in spacing from one another in any number of ways. Furthermore, while the nozzles 112A-O of the present example are shown as being substantially similar to one another in terms of shape, location, size, orientation, etc., the characteristics of one or more nozzles 112A-O may differ from one another.

The nozzles 112 may be positioned along the same plane relative to one another. As shown in FIG. 6, for example, nozzles 112A-O each include a bottom edge surface 148 that can be spaced the same distance X away from outer surface 146 of duct 108, such that bottom edge surface 148 of nozzles 112A-112O are positioned along the same plane. The placement of nozzles 112A-112O relative to one another can help to further facilitate even distribution of air flow through the nozzles 112A-O and onto dome surface 103.

The nozzles may be oriented toward dome 102. For example, each of nozzles 112A-O may be angled toward dome surface 103. Turning to FIG. 7, for example, bottom surface 128 of duct 108 lies along a third plane 140. The central portion of nozzle 112B may extend through parallel plane 140A, which is parallel to third plane 140, such that nozzle 112B is positioned at an acute angle Ø relative to parallel plane 140A. Angle Ø may range, for example, from twenty degrees to eighty-nine degrees. An exemplary angle may be fifty degrees.

The nozzles 112A-O may have a uniform shape. For example, as shown in FIGS. 6-7, the overall shape and profile of nozzles 112A-O is an oblong circle. The shape can be uniform from the bottom edge 148 of the respective nozzle 112 to the outer edge 149 of the respective nozzle 112. In other examples, portions of the nozzles 112A-O may have different shapes and sizes, and the nozzle 112 may taper.

The nozzles 112 may include two openings. A first opening 142 may be an opening to passageway 126 and the second opening 144 is directed toward dome 102. In this example, the shape of openings 142,144 may be oblong, but the openings 142, 144 are not limited to such shape and may take on other shapes. The openings 142,144 of each nozzle may be identical to one another or differ.

To help ensure that air is evenly distributed onto dome surface 103, duct 108 may be positioned around dome 102 at a constant distance between the dome surface 103 and each nozzle 112A-O. For example, as best illustrated in FIG. 2, the dome 102 to nozzle radial gap 150 may range from 25-70 mm. But other radial gaps are contemplated within the scope of the embodiments disclosed herein.

An air source may be used to provide air flow through the duct 108. For example, a blower capable of producing a constant flow rate of at least 20-80 cubic feet per minute (cfm) and at least 100-500 Pascals (Pa) of pressure head may be utilized. In this example, the blower may be an impeller 152 positioned at air intake entrance 118. Impeller 152 may be a centrifugal and reverse curve impeller 152 that is capable of generating and distributing the airflow necessary to flow through duct 108 and cool down dome 102. In other examples, other type of impellers 152, a fan, and other blower sources configured to provide a constant flow rate and pressure may be utilized.

During operation of the cooling system, the air source generates and distributes air through duct 108. In this example, the air source is a single point air source that distributes air through duct 108. Air flowing through duct 108 can exit duct 108 through the nozzles 112A-O at a constant speed and/or pressure. Due to the configuration of the cooling system and duct 108, air flowing from the air source through duct 108 can exit the duct through each of the nozzles 112A-O at a constant speed and pressure. For example, the air may exit the nozzles such that the speed of the airflow at each nozzle is substantially the same. In some examples, the velocity of airflow at each nozzle may not differ from the velocity of airflow at the other nozzles by more than a difference ranging from 1-8 m/s, although other ranges within this range or outside of this range are also acceptable. For example, the velocity may not differ more than 5 m/s. In other examples, an increased difference in velocity between two or more nozzles may be desired or acceptable. Similarly the velocity of airflow at each nozzle may not differ from more than 1-3 m/s.

Figure 8:
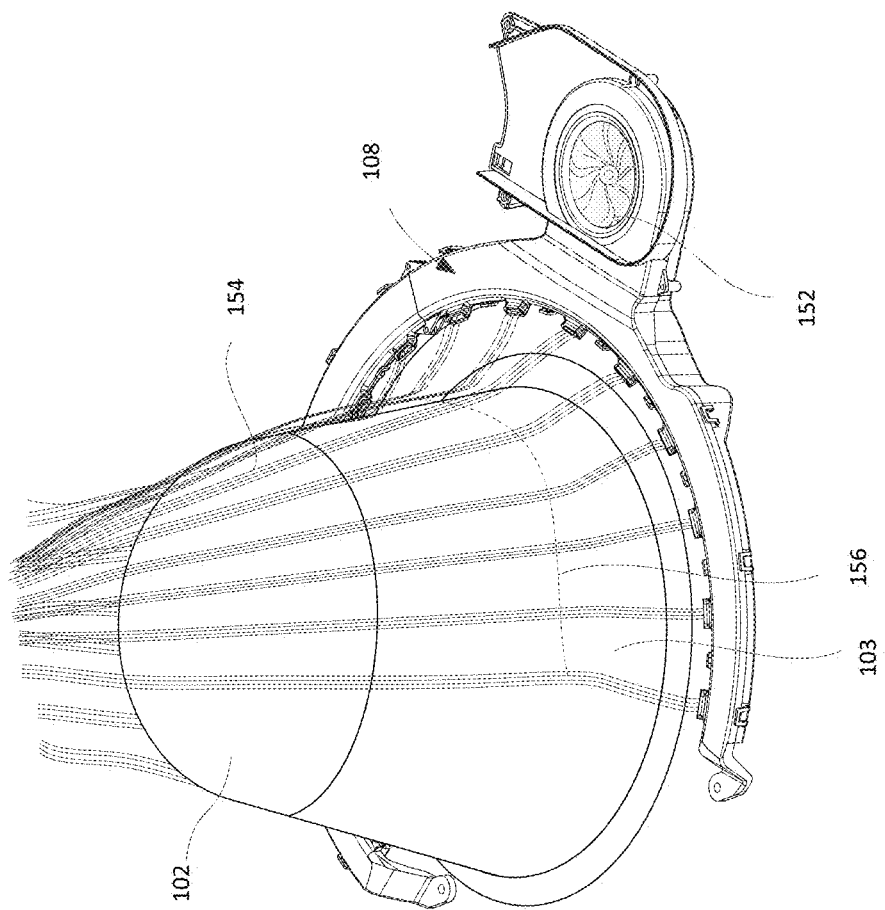
FIG. 8 is the cooling system of FIG. 2 in operation.

The orientation or angle of each of the nozzles 112 directs each of the plurality of air streams 154 to similar points around the circumference of the dome 102. For example, as shown in FIG. 8, a plurality of air streams 154 are directed by the nozzles 112A-O toward dome 102. The air streams 154 contact the dome 102 along a circumferential reference line 156. As shown in this example, when the airstreams 154 are adjacent surface 103 of dome 102, the plurality of air streams 154 travel upward and over the top surface of dome 102. The plurality of air streams 154 of air can be at a constant speed and pressure from the point they contact the dome 102 and travel upward and over the dome 102. The constant speed and pressure allows for efficient and rapid cooling 104 of the surface of the dome 102.

Figure 9:
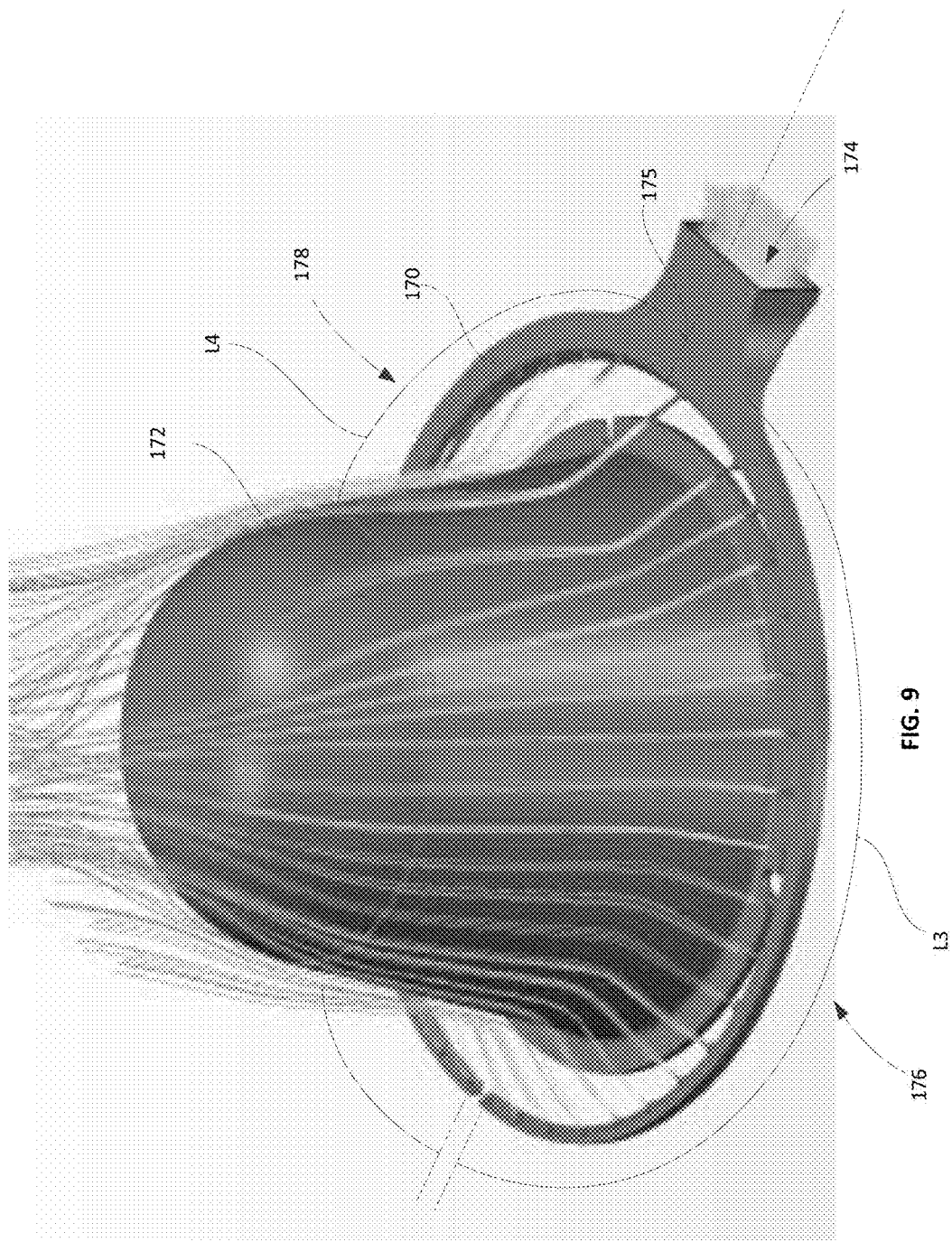
FIG. 9 is a perspective view of another duct according to another example embodiment.

Another example duct that may be used with cooling system 100 is illustrated in FIG. 9. In this example, duct 170 extends almost entirely around the circumference of dome 172. In this example, the air intake entrance 174 is positioned at a point 175 half way between the first and second ends of the duct, such that first and second arms 176,178 of duct 108 have respective equal lengths L3, L4. Air flowing into duct 170 exits through nozzles 180 spaced around the duct 170. Air streams 182 uniformly extend along the sidewalls and top surface of dome 172, such that dome 172 can be uniformly cooled around all surfaces.

Figure 10:
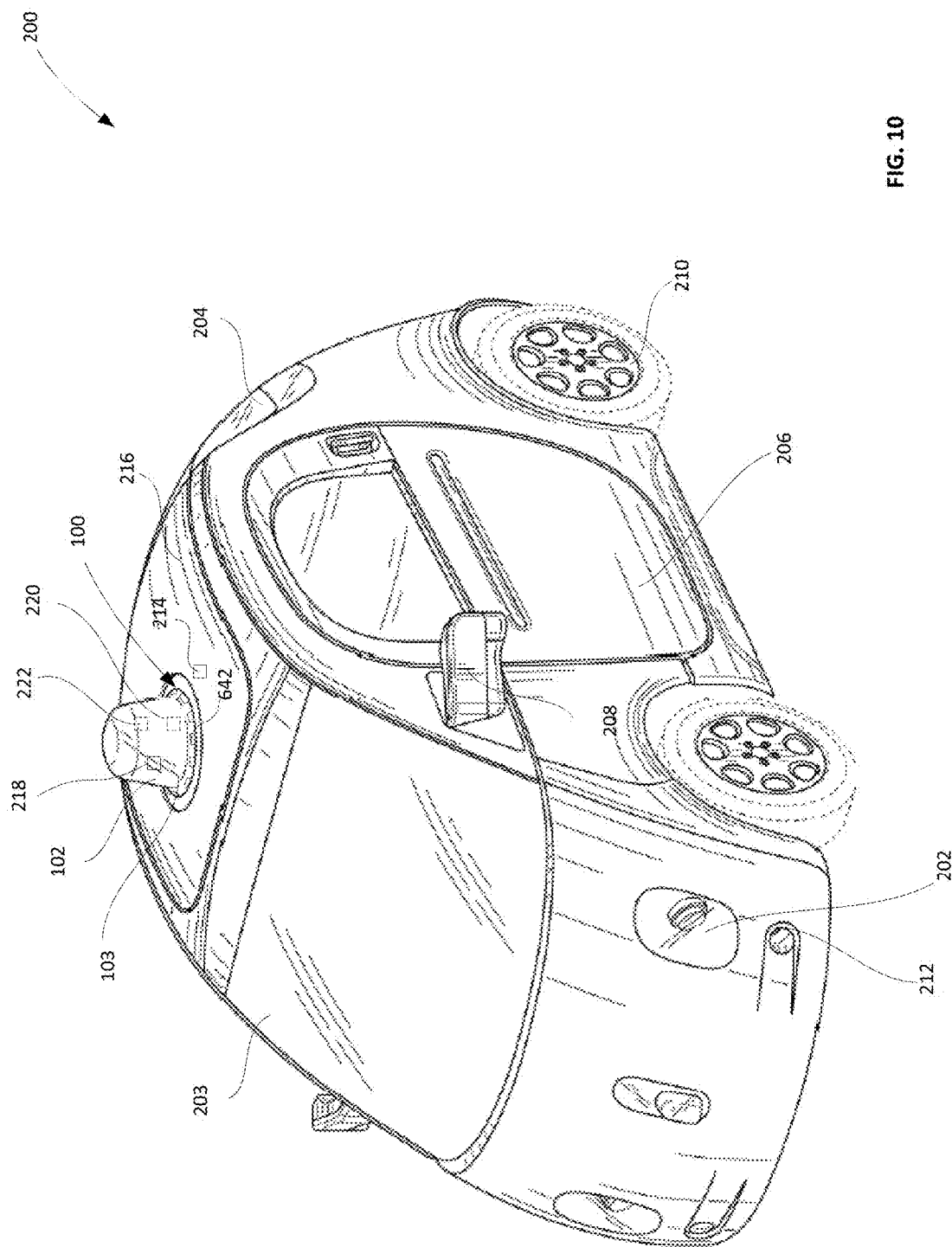
FIG. 10 is an example external view of a vehicle according to aspects of the disclosure.

Cooling system 100 can be used with any type of vehicle assembly. While certain aspects of the disclosure are particularly useful in connection with specific types of vehicles, the vehicle assembly may be any type of vehicle assembly including, but not limited to, cars, trucks, motorcycles, busses, recreational vehicles, etc. Turning now to FIG. 10, an example vehicle assembly 200 with a schematic representation of cooling system 100 on the roof of the vehicle assembly is shown. As can be seen, vehicle assembly 200 includes many features of a typical vehicle such as headlights 202, windshield 203, taillights/turn signal lights, rear windshield 204, doors 206, side view mirrors 208, tires and wheels 210, and turn signal/parking lights 212. In this example, vehicle assembly 200 is an autonomous vehicle, such as a vehicle that does not require a human driver and can be used to aid in the transport of passengers or items from one location to another. Such vehicle may operate in a fully autonomous mode where passengers may provide some initial input, such as a destination, and the vehicle maneuvers itself to that destination. In other examples, vehicle assembly 200 may require a human driver, such as in semi-autonomous mode.

Vehicle assembly 200 also includes a housing, which may be in the shape of a dome 102. Dome 102 may include a planar bottom surface that is positioned on top of vehicle assembly 200. One or more laser devices having 360° or narrower fields of view and/or one or more camera devices may be positioned within dome 102. In addition or alternatively, dome 102 may include, for example, one or more radar and/or sonar devices.

Cooling system 100 will typically be used or activated when the vehicle assembly is in a stationary or non-moving position. When the vehicle assembly is in a stationary position, no air from the environment circulates at or near dome 102. Thus, cooling system 100 may be required to regulate the temperature of the dome 102 and components within the dome 102. For example, cooling system 100 may be required when the vehicle assembly 102 car is in a parked or stationary position; when the vehicle assembly is stopped at a stop light; or when the vehicle assembly stops or travels at slow speeds during heavy traffic.

When the vehicle assembly 200 is in motion and traveling at a certain speed, such as approximately 20 mph and over, the cooling system 100 may not be activated. While the vehicle assembly 200 is in motion, a stream of air from the environment flows over dome 102. This air stream 154 can help to cool the temperature of the dome 102.

Control System for Cooling System

The cooling system may also include a control system that controls activation or deactivation of the air source. The control system may include one or more processors which process information in order to control aspects of the cooling system 100 as discussed below.

Figure 11:
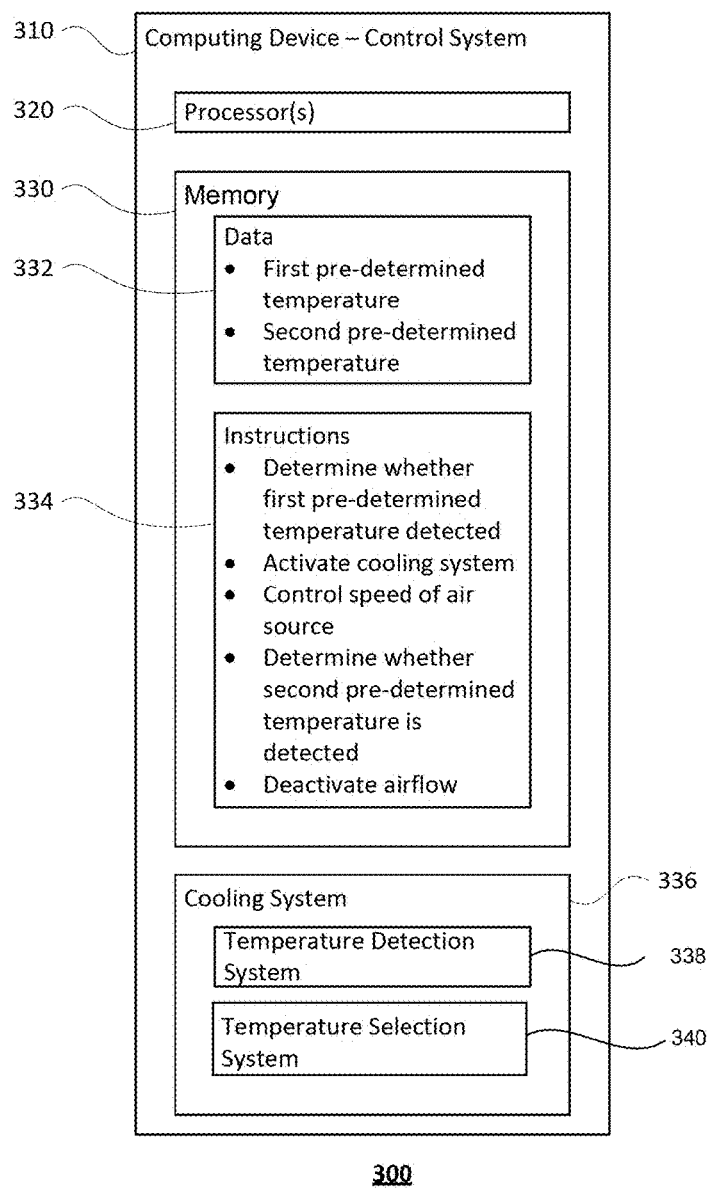
FIG. 11 is an example control system of a vehicle according to aspects of the disclosure.

FIG. 11 illustrates an example 300 of a computing device or control system for a vehicle assembly in which the features described above may be implemented. The computing device may contain one or more processors, memory, and other components generally found in general purpose computing devices.

As shown in FIG. 11, a vehicle assembly 200 in accordance with one aspect of the disclosure may have one or more computing devices, such as vehicle computing device 310 containing one or more processors 320, memory 330 and other components typically present in general purpose computing devices.

The memory 330 stores information accessible by the one or more processors 320, including data 332 and instructions 334 that may be executed or otherwise used by the processor 320. The memory 330 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 334 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 332 may be retrieved, stored or modified by processor 320 in accordance with the instructions 334. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 320 may be any conventional processors, such as commercially available CPUs. Alternatively, the one or more processors may be a dedicated device such as an ASIC or other hardware-based processor. Although FIG. 11 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 310. Accordingly, references to a processor or computing device will be understood to include references to a collection of processors or computing devices or memories that may or may not operate in parallel.

In one example, computing device 310 may be a control system incorporated into vehicle assembly 200. The control system may be capable of communicating with various components of the vehicle. For example, computing device 310 may be in communication with various systems of vehicle assembly 200, such as cooling system 336 that can control the temperature of the dome 102 and components within the dome 102, a temperature selection system 340, and a temperature detection system 338.

Control system 310 may receive signals from other components in vehicle assembly 200 indicating that the cooling system 336 should be activated. In such example, control system 310 may activate the air source and cause the impeller 152 to begin rotating so that an air flow can be generated. Control system 310 may also receive signals indicating the temperature of one or more components at or near the dome 102. Control system 310 can and provide signals to other devices, such as the air source to begin generating an air flow. Again, although the cooling system 336 is shown as part of computing device 310, cooling system 336 may be a separate system in communication with control system 310.

Control system 310 can activate the air source of cooling system 336 when the temperature at the dome 102 or adjacent the dome 102, or the temperature of components within the dome 102 reaches certain pre-determined temperatures. For example, when temperature sensors positioned at or near the dome 102 or on or within equipment within the dome 102 indicate that the temperature is at a critical temperature, control system 310 may receive a message or signal that a threshold temperature has been reached. The message may be transmitted from another system within the vehicle assembly or control system 310 that detects the temperature at or near the dome 102, such as a temperature detection system 338, discussed below.

Control system 310 may further include a temperature detection system. For example, a temperature detection system 338 may continuously monitor the temperature of devices positioned within the dome 102, as well as monitor the temperature at, near, or within dome 102. The temperature detection system 338 may include its own memory, data, instructions, and processors.

The temperature detection system 338 may include one or more temperature sensors positioned at or near the dome 102 to detect the current temperature inside or outside of the dome 102. For example, when more than one temperature sensor is used, temperature sensors can be strategically positioned to provide an indication of whether a critical temperature has been reached. For example, with reference back to FIG. 10, temperature sensor 214 may be positioned adjacent the dome 102 and on roof 216 of vehicle assembly 200. Temperature sensor 218 may be positioned on an exterior surface 103 of dome 102. Temperature sensor 220 may be positioned within the ambient space within the dome 102, such as on an interior surface of dome 102 or at another location within the interior space of dome 102. Temperature sensors may be associated with one or more individual pieces of equipment within the dome 102, such as laser scanning devices or camera devices. For example, temperature sensor 222 may be positioned on the surface of laser scanning devices or within the housing of the laser scanning devices.

Temperature sensors can be used to send signals to the control system, as discussed in more detail herein, indicating that a certain first threshold temperature has been reached or that the system has been cooled down to an acceptable second temperature below the critical temperature. The first and second pre-determined temperatures can be used to determine when to activate or deactivate the cooling system 336.

Humidity sensors can also be incorporated into the cooling system. For example, humidity sensors can be used to detect the humidity of the interior of the dome 102 or the exterior of the dome 102. In this example, as shown in FIG. 10, a humidity sensor 230 may be provided adjacent temperature sensor 214. The level of humidity can also be considered when determining the first and second pre-determined temperatures. Alternatively, when a certain humidity has been reached, the humidity sensor can send signals to the control system, indicating that the cooling system 100 should be activated or deactivated.

The first pre-determined threshold temperatures and second pre-determined temperatures may be determined in various ways. For example, pre-set factory settings may be established for one or more of the sensors in the cooling system 100. A temperature selection system can also be used make the determination, such as temperature selection system 340 discussed below.

Temperature selection system 340 (FIG. 11) may be used to select and set one or both of the first pre-determined threshold temperatures and second pre-determined temperatures that are used by the temperature detection system to automatically trigger the activation and deactivation of the cooling system 100. The temperature selection system 340 may be a part of the temperature detection system or it may be a separate system that communicates with the temperature detection system. The temperature selection system 340 may include its own memory, data, instructions, and processors.

The temperature selected by the temperature selection system 340 for the first pre-determined threshold temperature and second pre-determined temperature can correlate to the expected temperature at which one or more pieces of equipment within the dome 102 may malfunction. For example, if laser scanners positioned within the dome 102 are predicted to malfunction at eighty-five degrees, the temperature selection system 340 may determine that the first threshold temperature should to be a temperature below eighty-five degrees. For example, eighty degrees may be selected as the threshold temperature to prevent the temperature of the laser scanners from approaching eighty four degrees. Similarly, the second pre-determined temperature, which is used to determine when the cooling system 100 should be deactivated, can be set to a temperature below the threshold temperature of eighty degrees, such as seventy-eight degrees.

The first pre-determined threshold temperature and second pre-determined temperature can be further determined based upon several variables. For example, the second pre-determined temperature may be dependent upon the time of day and the weather. At night or during an overcast day, it may only be necessary to cool the dome 102 down to the threshold temperature or one or two degrees below the threshold temperature. In contrast, in the afternoon on a sunny day, it may instead be necessary to cool the dome 102 or components within the dome 102 down to ten degrees below the threshold temperature, in anticipation of the temperature rapidly rising again.

The first pre-determined threshold temperature and second pre-determined temperature can also be based on a combination of the level of humidity and the temperature. As discussed above, one or more humidity sensors can provide the humidity of the environment within the dome 102 or exterior to the dome 102. On a very hot and humid day, the temperature selection system may select, for example, a first pre-determined threshold temperature that is lower than a day that may be hot, but with lower humidity.

The temperature selection system may select a threshold temperature and a second pre-determined temperature for one or more sensors in the system. For example, the temperature selection system may set the threshold temperatures at or below eighty degrees for each temperature sensor in the system. The temperature selection system can alternatively set a different threshold temperature for one or more sensors. For example, the temperature of surfaces exterior to dome 102 may be hotter than the temperature of the space within dome 102 and the equipment within the dome 102, due to direct exposure to sunlight. Threshold temperatures for sensors 214,218, which are exterior to the dome 102, may be selected that are slightly higher than the threshold temperature for sensors 220,222 positioned within the dome 102 to accommodate for this difference.

The temperature selection system can conduct complex algorithms to determine parameters that define when the cooling system 336 should be activated and deactivated. For example, as discussed above, temperature selection system can determine the first pre-determined threshold temperature and the second pre-determined temperature. These temperatures can be based on many variables, such as actual temperature, weather, humidity, time of day, etc., as discussed above.

The processors of the temperature detection system 338 can conduct complex algorithms to determine when the temperature has reached a threshold temperature and when the cooling system 336 should be activated, as well as when the temperature is sufficient for the cooling system 336 to be deactivated.

When control system 310 receives a message from the temperature detection system 338 that a first threshold temperature has been reached, control system 310 can activate cooling system 100 and cause the air source to generate an air flow. For example, control system 310 can activate impeller 152, thereby causing an airflow to begin to flow through the air ducts 108, exit the nozzles 112, and onto the surface of dome 102.

Conversely, when the control system 310 receives a message from the temperature detection system 338 that the temperature has reached a second pre-determined temperature, control system 310 can deactivate impeller 152, so that impeller 152 stops rotating and no more air flows through the duct 108.

One or more temperature sensors may communicate with control system 310 to indicate that a certain temperature has been detected. For example, each time a temperature sensor indicates that a threshold temperature of the dome 102 or components within the dome 102 has been reached, temperature sensor 302 can send a signal to control system 310 indicating that a certain temperature has been detected. Control system 310 may send a signal to the cooling system 100 to activate the system when the threshold temperature has been reached. Similarly, each time a temperature sensor indicates that the temperature is at a second pre-determined temperature below the threshold temperature, temperature sensor 302 can send a signal to control system 310 indicating that the second pre-determined temperature has been detected. Control system 310 may also send a signal to the cooling system 100 to deactivate the system when a second pre-determined temperature below the threshold temperature has been reached.

FIG. 12 is an example flow diagram 400 in accordance with some of the aspects described above that may be performed by one or more computing devices such as control system 310. In this example, control system 310 receives a signal at block 410. The signal indicates that a temperature taken at or near the dome 102 of the dome 102, a component within the dome 102, the space within the dome 102, or adjacent the dome 102 of a vehicle assembly, is a first threshold temperature. At block 420, control system 310 may activate the impeller 152 and cause air to flow through the duct 108 to cool the dome 102 to below the first threshold temperature.

When the control system 310 receives a signal indicating that the temperature taken at or near the surface of the dome 102, a component within the dome 102, the space within the dome 102, or adjacent the dome 102 of a vehicle assembly, is a second pre-determined temperature below the threshold temperature, at block 430, control system 310 will deactivate the impeller 152. This will cause the impeller 152 to discontinue rotating and causes air to flow through the ducts 108 and onto the surface of dome 102.

In another example, a first threshold temperature may be first determined by a user or automatically determined by the temperature selection system. After the threshold temperature is determined, steps 410-430 can be conducted.

FIG. 13 is another flow diagram 500 in accordance with some of the aspects described above that may be performed by one or more computing devices such as control system 310. In this example, a first threshold temperature is determined at block 510. At diamond 520, a determination is made as to whether a first threshold temperature is detected. If the answer is "no," the first threshold temperature is determined again. If the answer is "yes," the cooling system 100 is activated at block 530. At diamond 540, it is determined whether a second pre-determined temperature has been detected. If "no," the cooling system 336 remains activated and steps 530 and 540 are repeated. If the answer is "yes," the cooling system 100 is deactivated. In another example, once the system is deactivated, the process may begin again and a first threshold temperature may be determined again.

It is to be appreciated that in addition to automating the cooling system 100 or as an alternative to automating the cooling system 100, a user can manually operate the cooling system 100. For example, if a user determines that the temperature within the dome 102 or components within the dome 102 is at a critical temperature, a user can manually activate the cooling system 100. The user may be able to access a control panel or the like within the vehicle assembly that provides the user with the ability to turn on and turn off cooling system 336. Similarly, the user may able to manually deactivate the cooling system 336. For example, if a user determines that the temperature at or near the dome 102 is no longer at a critical temperature or that the cooling system 336 has been operating for a sufficient amount of time, the user can further deactivate the cooling system 336 using the control panel.

In the examples discussed above, relative positions such as upper, lower, top, bottom, lateral, longitudinal, horizontal, vertical, and the like are used for reference only and are not intended to be limiting with respect to particular positions of the elements they are used to describe. Additionally, while particular methods are described and shown in a specific order in the appended drawings, such methods are not limited to any particular order unless such order is expressly set forth herein. Furthermore, additional steps may be added and one or more disclosed steps omitted.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
    a dome having an exterior surface and an interior surface, the exterior surface facing an external environment of the dome, the interior surface defining an interior space within the dome;
    a control device;
    a temperature sensor positioned at or near the dome, the temperature sensor configured to send a notification signal to the control device when a pre-determined temperature of the external environment at or near the dome is detected;
    a cooling device comprising a duct extending at least partially around a base of the exterior surface of the dome, the duct having an interior passageway and a plurality of nozzles spaced around the duct and oriented towards the exterior surface of the dome; and
    an air source configured to distribute air through the interior passageway and the plurality of nozzles,
    wherein the control device includes one or more processors configured to:
        receive the signal from the temperature sensor;
        determine whether to activate the air source; and
        activate the air source based upon the determination to cause air from the plurality of nozzles to contact the exterior surface.

2. The system of claim 1 further comprising a vehicle, the dome positioned on top of the vehicle.

3. The system of claim 1, wherein the duct comprises two arms at least partially extending around the base of the exterior surface of the dome, the two arms joined together at one end and each having respective free ends, the free ends spaced apart from one another so as to create an opening between the free ends.

4. The system of claim 1, wherein the air source is a single point blower.

5. The system of claim 1, wherein the plurality of nozzles are evenly spaced around the duct, at least some of the plurality of nozzles having an acute angle relative to a base of the duct.

6. The system of claim 1, further comprising at least one humidity sensor positioned at or near the dome.

7. The system of claim 1, wherein the step of determining whether to activate the air source is based upon whether a first pre-determined temperature is detected, and wherein the step of determining whether to deactivate the air source is based upon whether a second pre-determined temperature is detected.

8. The system of claim 1, wherein the base is a planar bottom surface having a circumference.

9. The system of claim 1, wherein the plurality of nozzles are arranged at a constant radial distance from the exterior surface.

10. The dome of claim 1, wherein the base of the dome is configured to be positioned on an external surface of a roof of the vehicle.

* * * * *